(12) United States Patent
Huang et al.

(10) Patent No.: US 9,013,416 B2
(45) Date of Patent: Apr. 21, 2015

(54) MULTI-DISPLAY TYPE DEVICE INTERACTIONS

(75) Inventors: Mingjing Huang, San Francisco, CA (US); Christopher S. A. MacGregor, Seattle, WA (US); Dennis Hodge, Bellevue, WA (US); Isaac S. Noble, Soquel, CA (US); Bradley J. Bozarth, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 578 days.

(21) Appl. No.: 13/035,325

(22) Filed: Feb. 25, 2011

(65) Prior Publication Data

US 2012/0218191 A1 Aug. 30, 2012

(51) Int. Cl.
*G06F 3/041* (2006.01)
*G06F 1/16* (2006.01)
*G06F 3/0486* (2013.01)
*G06F 3/0487* (2013.01)
*G06F 3/0488* (2013.01)

(52) U.S. Cl.
CPC ............ *G06F 1/1643* (2013.01); *G06F 1/1692* (2013.01); *G06F 3/0486* (2013.01); *G06F 3/0487* (2013.01); *G06F 3/04883* (2013.01)

(58) Field of Classification Search
CPC ...... G06F 3/041; G06F 1/1616; G06F 1/1643
USPC ......................................................... 345/173
See application file for complete search history.

(56) References Cited

U.S. PATENT DOCUMENTS

| | | | |
|---|---|---|---|
| 2007/0075915 A1* | 4/2007 | Cheon et al. | 345/1.1 |
| 2008/0072163 A1* | 3/2008 | Teng et al. | 715/761 |
| 2009/0085894 A1 | 4/2009 | Gandhi | |
| 2009/0102744 A1 | 4/2009 | Ram | |
| 2009/0307633 A1 | 12/2009 | Haughay, Jr. | |
| 2010/0302179 A1* | 12/2010 | Ahn et al. | 345/173 |
| 2011/0001687 A1* | 1/2011 | Srinivasan et al. | 345/3.1 |
| 2011/0043435 A1 | 2/2011 | Herbenstreit et al. | |
| 2011/0163977 A1* | 7/2011 | Barnhoefer et al. | 345/173 |

OTHER PUBLICATIONS

, "PCT International Search Report and Written Opinion dated May 25, 2012", International Application No. PCT/US20 12/26126, May 25, 2012, 8 pages.

* cited by examiner

*Primary Examiner* — Grant Sitta
*Assistant Examiner* — Charles Zheng
(74) *Attorney, Agent, or Firm* — Novak Druce Connolly Bove + Quigg LLP

(57) ABSTRACT

An electronic device including two or more display elements can provide enhanced functionality with improved rates of power consumption. A user can cause information that does not change rapidly to be provided or moved to a relatively static display element, such as an electronic ink display, which enables that information to be displayed for a period of time with little additional power consumption. Similarly, content (e.g., video) that changes rapidly can be displayed on a relatively dynamic display element, such as and LCD or OLED display. Each display can be touch sensitive, such that a user can move content between the displays by pressing on, or making a motion in contact with, at least one of the displays. Various modes can be activated which cause certain types of content to be displayed on the dynamic and/or static display element.

24 Claims, 6 Drawing Sheets

MULTI-DISPLAY TYPE DEVICE INTERACTIONS

BACKGROUND

People are utilizing electronic devices, particularly portable electronic devices, for an increasing number and variety of tasks. It is not uncommon for a user to have a personal media player, notebook computer, cell phone, and electronic book reader, among other such devices. Further, the demands on these devices increase as the devices offer enhanced functionality. For example, a tablet computer or portable gaming platform might perform most, if not all, of the tasks performed by the devices above.

In many instances, however, the physical limitations of many of these devices can still prevent these tasks from being performed simultaneously and/or limit the functionality that can be offered by such a device. For example, a conventional cellular phone will typically have a single, small screen that can only provide a limited amount of information at any given time while still being readable and/or useful for a user. Further, many of these devices utilize bright, full color screens that can require a significant amount of power independent of the current application, or low refresh rate screens that drain less power but do not enable functionality such as adequate video playback or video chat.

BRIEF DESCRIPTION OF THE DRAWINGS

Various embodiments in accordance with the present disclosure will be described with reference to the drawings, in which.

DETAILED DESCRIPTION

Figure 1:
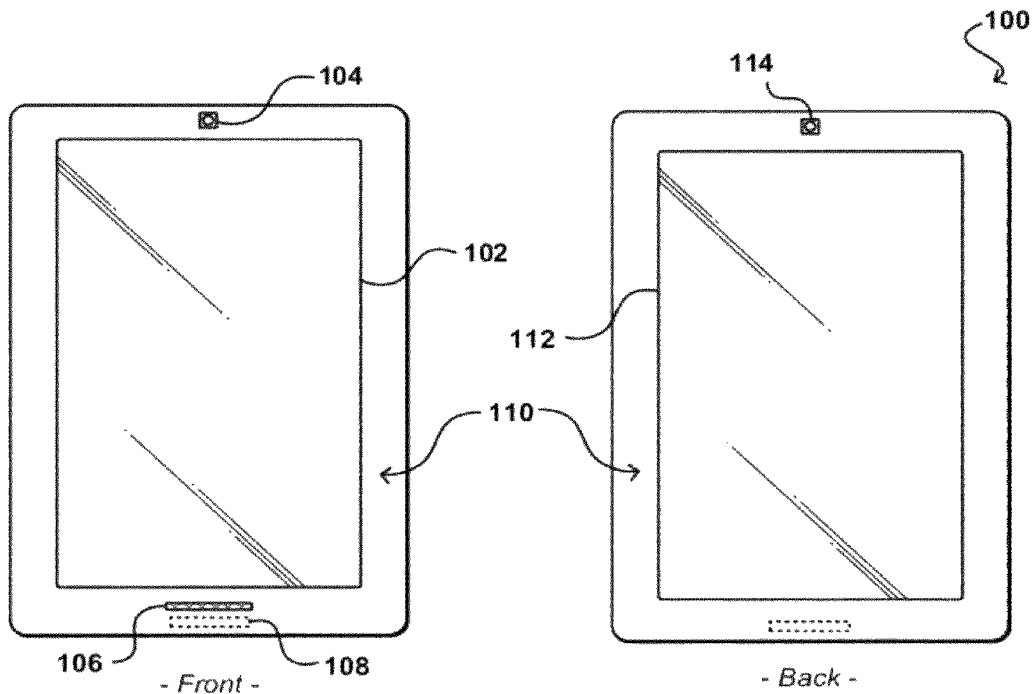
FIG. 1 illustrates front and back views of an example electronic device that can be used in accordance with various embodiments.

Systems and methods in accordance with various embodiments of the present disclosure overcome one or more of the above-referenced and other deficiencies in conventional approaches to displaying content on an electronic device. In particular, various embodiments provide at least two different display elements with differing display characteristics, enabling content to be selectively displayed on those elements as appropriate for purposes such as reduced power consumption and improved visibility. Further, one or more of these display elements can provide touch sensitivity such that a user can provide input via contact with one or more of the display elements, enabling additional types of interaction.

In various embodiments, an electronic device includes a relatively dynamic display element, such as a liquid crystal display (LCD) or organic light emitting diode (OLED) display screen, and a relatively static display element, such as an electronic paper display (EPD) or electronic ink (e-ink) screen. The relatively dynamic display element can have a significantly higher refresh rate in at least some embodiments, as well as other differing capabilities, that enable the dynamic display to provide content such as high resolution video. The relatively static element, on the other hand, might have a much lower refresh rate (e.g., on the order of a couple Hertz) that may be more appropriate for displaying content that does not change as often, such as pages of a book or a map. Because a static display can offer much lower power consumption, the device can advantageously display certain types of content using the static display. Further, each type of display might be advantageous for viewing content in different situations, such as may depend upon the present lighting conditions, such that a user can advantageously cause content to be displayed on one display screen at one time and on another display screen of the device at another time.

In at least some embodiments, at least one of the display screens can provide touch or contact input. In some embodiments, both display screens can provide for touch input, as well as other portions of the device in some cases. A user can utilize touch input to cause content to shift between display screens. In one embodiment, a user can apply at least a certain amount of pressure to the location of an item displayed on one of the screens to appear to "push" that item through to the other side, whereby the item can be displayed on the other display screen. In another embodiment where a side of the device is also touch sensitive, the user can drag an item off the current screen, around the edge of the device, and drop the item on the other screen. Various other approaches can be used as well as discussed elsewhere herein.

There can be various modes of operation for a device that cause certain types of information to be displayed on a dynamic, static, or other display element at different times or under different conditions, as may be configurable by a user. For example, in direct sunlight the device might cause information to be displayed on an e-ink display while the information might instead be displayed on an LCD screen if there is no ambient light detected. A device might alternatively utilize at least one camera to determine which side of the device is facing the user, and might activate the display on that side of the device to convey content. A device might display notifications on an edge of the device, such that a current orientation of the device might be less important.

Various other applications, processes and uses are presented below with respect to the various embodiments.

FIG. 1 illustrates front and back views, respectively, of an example electronic user device 100 that can be used in accordance with various embodiments. Although a portable computing device (e.g., an electronic book reader or tablet computer) is shown, it should be understood that any electronic device capable of receiving and processing input, or at least capable of communicating and/or being charged, can be used in accordance with various embodiments discussed herein, where the devices can include, for example, desktop computers, notebook computers, personal data assistants, smart phones, video gaming consoles, television set top boxes, and portable media players. In this example, the user device 100 has a first display screen 102 on what will be referred to herein as the "front" side, although for certain devices or applications this side might act as a "back" side. The terms "front"

and "back" may not infer a direction at all, but can refer merely to opposing sides of the device. In this example, the first display screen 102 will display information, under normal operation, to a user facing the first display screen (e.g., on the same side of the computing device as the first display screen). The first display screen in this example can be any appropriate element capable of displaying information such as video content, as may include a high color, high refresh liquid crystal display (LCD) or other such element. In this example, the first display element 102 is a touch screen, enabling a user to provide input by applying pressure to, or at least coming into contact with, at least one position of the first display screen. Many touch screens are known in the art that can be used with such a display in accordance with some embodiments, such that they will not be described in detail herein.

The user device 100 in this example also has a second display screen 112 on what will be referred to herein as the "back" side, although as discussed above such designation can be for convenience and may not imply a directionality or relative importance of the first and second display elements. The second display screen 102 can display information, under normal operation, away from a user facing the first display screen (e.g., on the opposite side of the computing device as the second display screen). The second display screen in this example can be any appropriate element capable of displaying information with substantially lower power requirements, such as may result from a lower refresh rate, lower color, lower resolution, or different display type. In this example, the second display element 112 is an electronic ink (e-ink) or electronic paper display (EPD) element such as may be utilized in an electronic book reader where the displayed content (e.g., pages of a book) are not updated frequently. As known in the art, such elements typically require power only when changing the display state, such that the power consumption can be much lower than that of the first display element 102.

Further, the second display element can also be touch sensitive. For example, the second display element can include a transparent e-ink element overlaying a touch sensitive element, such as an Interpolating Force-Sensitive Resistance (IFSR) element. Unlike conventional capacitive sensors, an IFSR element can detect any object contacting the element, as well as the amount of pressure being applied to every point on the touch element by that object or any other object. In some embodiments, the second display element can allow for both capacitive and resistive touch inputs. The second display element can be multi-color, two color (e.g., black and white), or grayscale, and can be at a lesser, similar, or greater resolution than the first display element. The second display screen also can have a lower, similar, or greater refresh rate than the first display screen, although in many embodiments the second display screen will be an electronic ink display with a lower refresh rate and lower power consumption, while the first display element will be a full color display with a higher refresh rate capable of displaying video content. In at least some embodiments, such as an electronic book reader, the second display element might function as the primary display, while in other embodiments, such as for a tablet computer, the first display screen might function as the primary display. Various other options exist as well as discussed elsewhere herein. Also, IFSR can be used with the primary display screen or other portions of the device, as discussed elsewhere herein.

The example computing device 100 can have a number of other input mechanisms, such as at least one front image capture element 104 and at least one back image capture element 114 positioned on the device such that, with sufficient lenses and/or optics, the user device 100 is able to capture image information in substantially any direction about the computing device. The example user device 100 also can include at least one microphone 106 or other audio capture device capable of capturing audio data, such as words spoken by a user of the device.

The example user device 100 also includes at least one position and/or orientation determining element 108. Such an element can include, for example, an accelerometer or gyroscope operable to detect an orientation and/or change in orientation of the user device 100. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device. Various embodiments can include one or more such elements in any appropriate combination. As should be understood, the algorithms or mechanisms used for determining relative position and/or orientation can depend at least in part upon the selection of elements available to the device.

Figure 2:
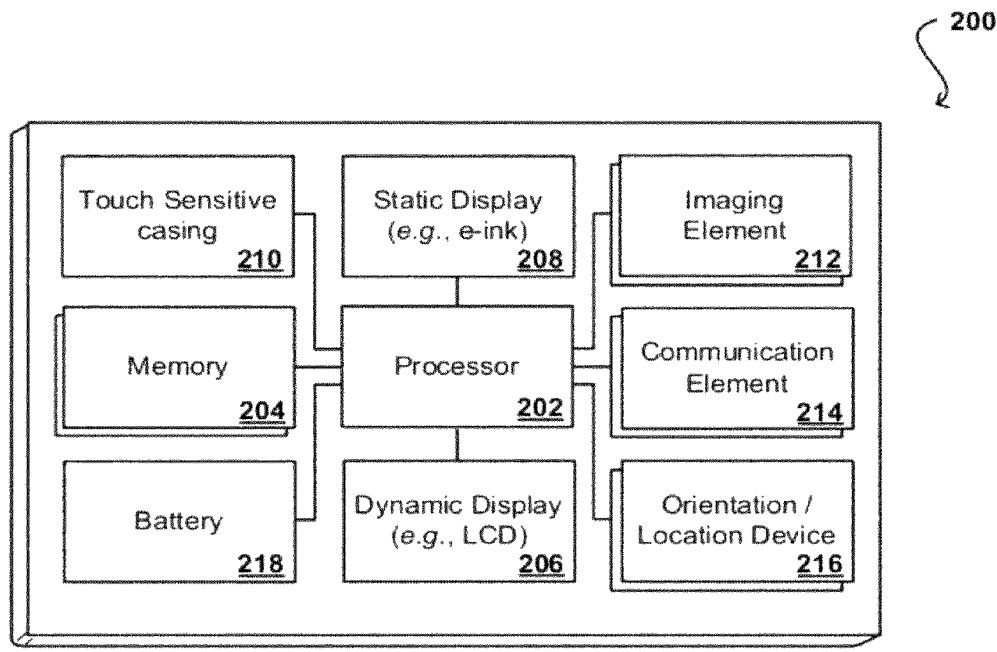
FIG. 2 illustrates example components of an example electronic device that can be used in accordance with various embodiments.

FIG. 2 illustrates a logical arrangement of a set of general components of an example computing device 200 such as the user device 100 described with respect to FIG. 1. In this example, the device includes at least one processor 202 for executing instructions that can be stored in a memory device or element 204. As would be apparent to one of ordinary skill in the art, the device can include many types of memory, data storage, or non-transitory computer-readable storage media, such as a first data storage for program instructions for execution by the processor 202, a separate storage for images or data, a removable memory for sharing information with other devices, etc. The device in this example includes at least one first display element, referred to herein as a "dynamic" display element 206 and at least one second display element, referred to herein as a "static" display element 208. The terms "static" and "dynamic" are not meant to be interpreted literally, but refer generally to the relative types of content and/or usage that may be appropriate for each type of display. For example, a relatively "dynamic" display element, such as an LCD screen, might be capable of displaying video content or substantially real-time interactive content with acceptable performance characteristics, while a relatively "static" display element, such as an electronic paper display, might be better suited to display content that does not change as often, such as a map or a current page of an electronic book. It should be understood that the content of a static display screen will change over time, and that content might remain unchanged on a dynamic display screen for at least a period of time. Further, in at least some embodiments it will be possible that each of the first and second display screens is able to display similar types of content with similar capabilities, such that one is not necessarily more static or dynamic than the other.

Each of the first and second display screens in this example device 200 can be at least partially touch sensitive, providing for input through contact with the screen (or a touch sensitive layer in contact therewith). In at least some embodiments, at least a portion of the casing 210 or surfaces other than the display screens can also be touch sensitive. For example, an outer edge or frame of the device might be at least partially able to receive touch input. An IFSR or similar material can be placed about the device such that any appropriate surface or portion can provide for input through contact. In at least some embodiments, at least one touch sensitive path will exist between the first and second display screens on opposite sides of the device.

As discussed, the device in many embodiments will include at least one image capture element 208 such as a camera or infrared sensor that is able to image objects in the vicinity of the device. It should be understood that image capture can be performed using a single image, multiple images, periodic imaging, continuous image capturing, image streaming, etc. Further, a device can include the ability to start and/or stop image capture, such as when receiving a command from a user, application, or other device. The device also can include one or more orientation and/or location determining elements 212, such as an accelerometer, gyroscope, electronic compass, or GPS device as discussed above. These elements can be in communication with the processor in order to provide the processor with positioning and/or orientation data.

In some embodiments, the computing device 200 of FIG. 2 can include one or more sideband or other such communication elements (not shown), such as a Wi-Fi, Bluetooth, RF, or another wireless communication system, enabling the user device to communicate with other devices or components, such as a charger or docking station. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The example device 200 also includes a battery 218 or other appropriate power source. The power source can include, for example, at least one rechargeable battery, and can include other elements as well such as solar power cells or other such elements.

Figure 3A:
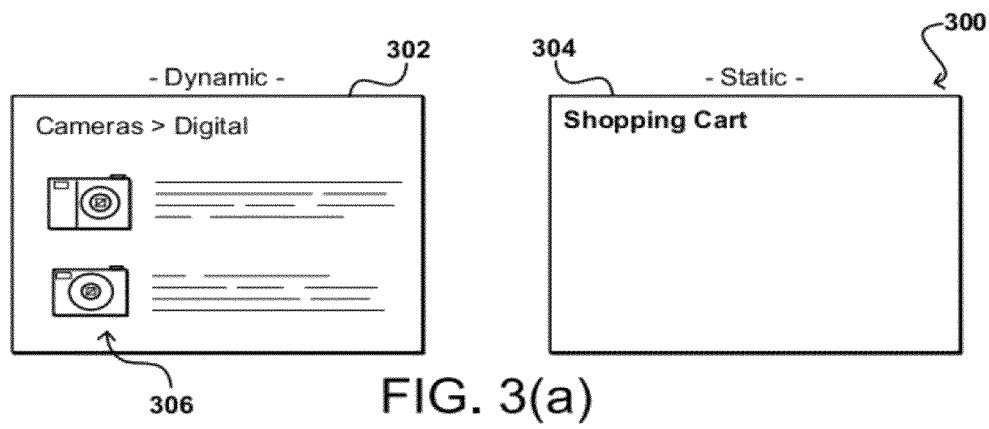
FIGS. 3(*a*), (*b*), and (*c*) illustrate an example approach to adding an item to a shopping cart using a device with dynamic and static display elements that can be used in accordance with various embodiments.

A device such as that described with respect to FIGS. 1 and 2 can offer several advantages over conventional computing devices, such as lower power consumption and increased functionality. For example, consider the example situation 300 of FIGS. 3(a)-3(c). In this example, a computing device has a dynamic display element 302 on one side and a static display element 304 on the opposite side, although various other placements can be used as well within the scope of the various embodiments. As illustrated in FIG. 3(a), a user is able to navigate and search for content 306, such as for items offered for consumption (e.g., purchase, rent, or download) through an electronic marketplace, using the dynamic display element 302. In this example, the user navigates using the dynamic display element as the user might want to scroll or flip through pages of results, which might require a higher refresh rate. The static display 304, however, might be used to display information such as which items have been added to a user's shopping cart. Typically, the number or selection of items in the user's shopping cart will not change very frequently, such that a lower refresh rate element might be adequate to display that information. Further, because an element such as an electronic paper display essentially only draws power while updating the display, the shopping cart information can be displayed with very little additional power consumption. Such an approach can be advantageous, as a user might want to have quick access to a shopping cart, such as to compare items or see what is currently in the cart, without having to navigate to another page or perform another such action. Further, the user might want to be able to have the current results and shopping cart displayed at the same time, which can be difficult for devices with small form factors that have limited area for display.

Figure 3B:
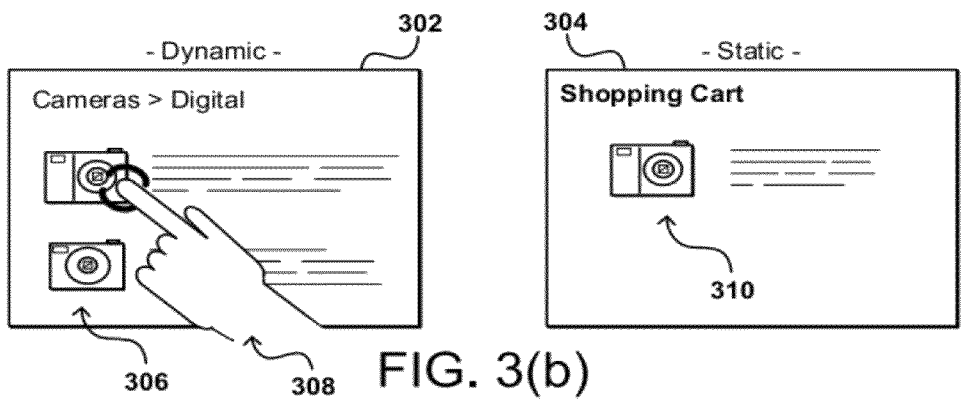
Figure 3C:
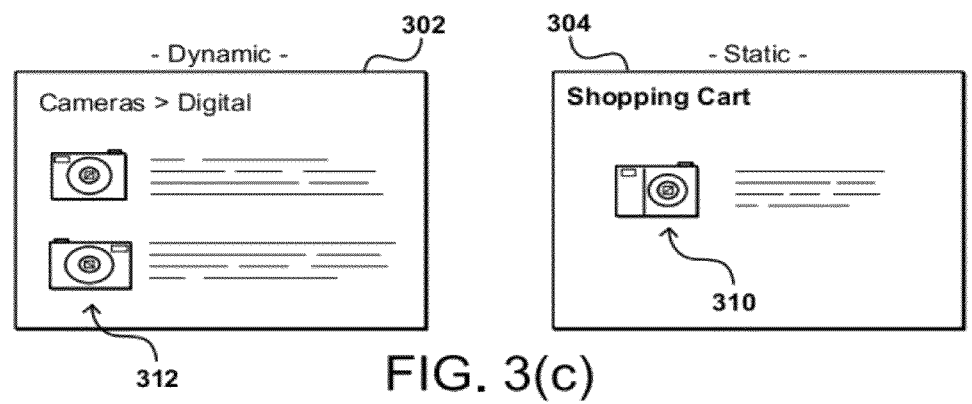

In many conventional approaches, a user might select to add an item to a shopping cart by selecting an "add to cart" or similar element. As illustrated in FIG. 3(b), however, a user can utilize the pressure-sensitive display to effectively "push" an item "through" to the other side. As can be seen, the hand of the user 308 is manipulated such that a finger presses on an image of an item to be added to the shopping cart. The interface can be designed such that a user pressing on an image of an item with sufficient pressure and/or for a sufficient period of time can cause the item to appear to "pass through" the device and appear on the other side as an item 310 in the shopping cart. Similarly, an item might be removed from the shopping cart by pushing on that item in the shopping cart, which can appear to push the item back into the electronic marketplace, whether or not that item is actually displayed again on the dynamic side. As illustrated in FIG. 3(c), the search results 312 might update once the item is pushed to the other side or otherwise added to the cart.

In another example, a user might view content such as a movie on a dynamic display element of a device. During a scene of the movie, for example, the static display element can display various types of information about that scene. The static display can provide storyboard information, script information, information about the actors in the scene, and/or various other types of information that may not change until the next scene. In some embodiments, the user can have the ability to touch the dynamic screen during the movie to obtain additional information about something in the movie. For example, the user might be able to press on an actor and obtain information about that actor on the other display. The user might also be able to press on an item in that movie and obtain information about that item, and potentially be able to buy that item through interaction with the static display.

Figure 4A:
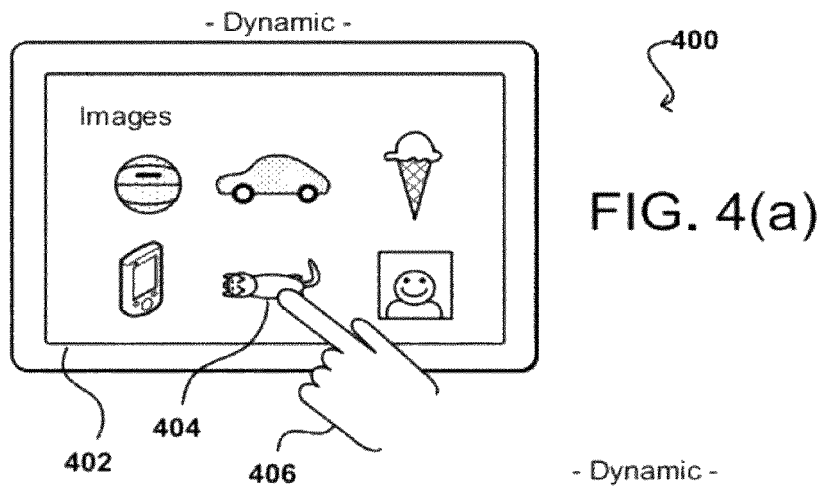
FIGS. 4(*a*), (*b*), (*c*), and (*d*) illustrate an example approach to selecting an item for display that can be used in accordance with various embodiments.

Thus, users can take advantage of the touch and/or pressure sensitivity of the display elements to move content back and forth between the elements by "pushing" the item through the device to the other side. However, other approaches can be used in accordance with various embodiments as well. For example, the situation 400 of FIG. 4(a) illustrates an arrangement of images displayed on the dynamic element 402 of a computing device. In this example, the user might use the static element on the other side of the device as a "skin," or an image that is displayed on the "back" surface of the device while the user is interacting with the dynamic display, for example. In this example, the hand 406 of the user is again manipulated to touch a selected image 404 to be moved to the static display element.

Figure 4B:
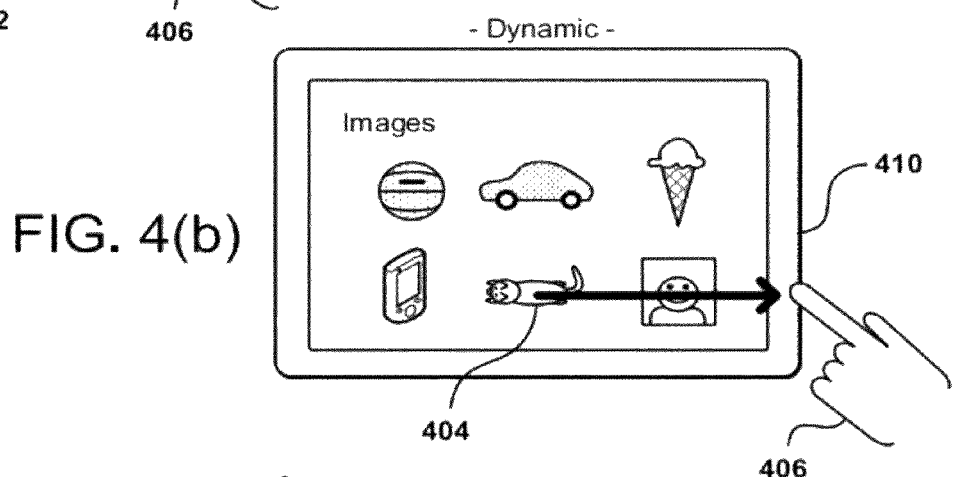
Figure 4C:
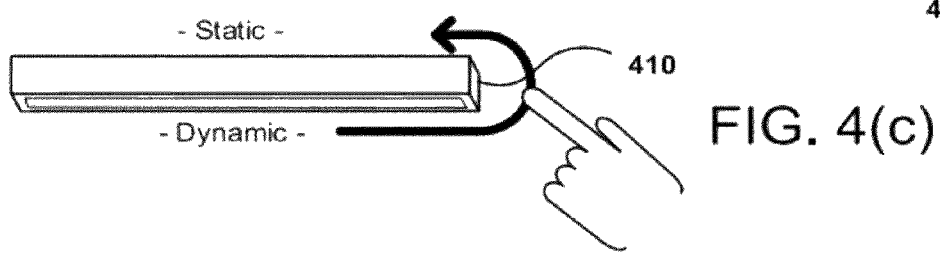
Figure 4D:
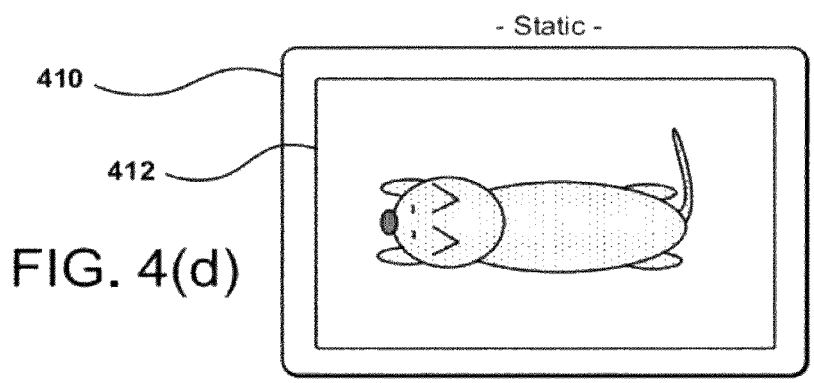

Instead of "pushing" the image through the device, however, the user can take advantage of at least one touch sensitive element placed on another surface of the device. For example, in FIG. 4(b) it can be seen that the user is able to make a motion with the user's finger to drag the selected image 404 across the dynamic display element. The casing 410 of the device in this example contains a touch sensitive material, such that the user can continue to drag the image off the screen and onto the casing. It should be understood, however, that unless the device also has display capability on the casing, the image may not be displayed off the display element(s). As illustrated in FIG. 4(c), which shows a top or side view of the device, the user can continue to move the user's finger around the side of the device and onto the static element in order to move the selected image 404 to the static display screen. In some embodiments, the user might not have to drag the user's finger all the way around the device to the other screen, as movement off the first screen and onto the casing might be sufficient to indicate to the device that the image is to be moved to the other side. As illustrated in FIG. 4(d), the selected image then can be displayed on the static display screen 412. In some embodiments, the image might be manipulated or converted based upon factors such as the relative size and resolution of the static screen, the application with which the image is being used, etc. In this example, a higher resolution image might be displayed as a skin than might have been displayed in the initial set of images, the image might be converted to be optimized for e-ink display, etc.

Figure 5A:
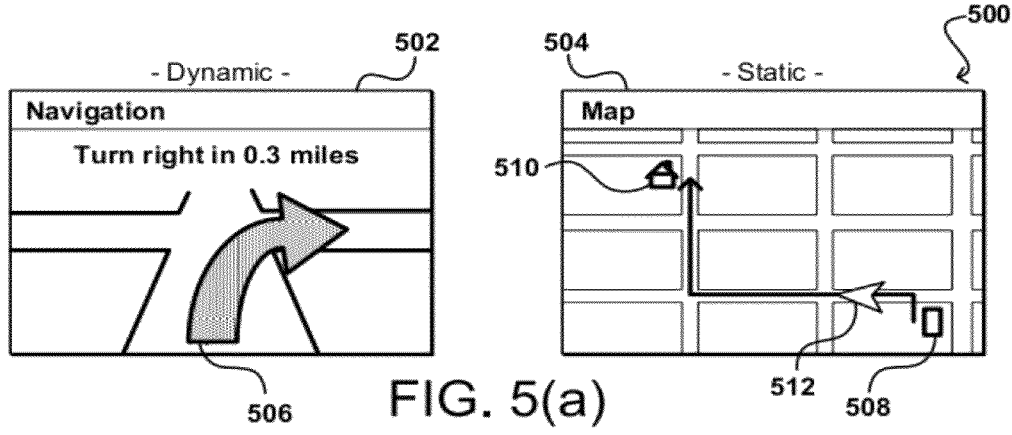
FIGS. 5(*a*), (*b*), and (*c*) illustrate an example approach to entering a waypoint that can be used in accordance with various embodiments.
Figure 5B:
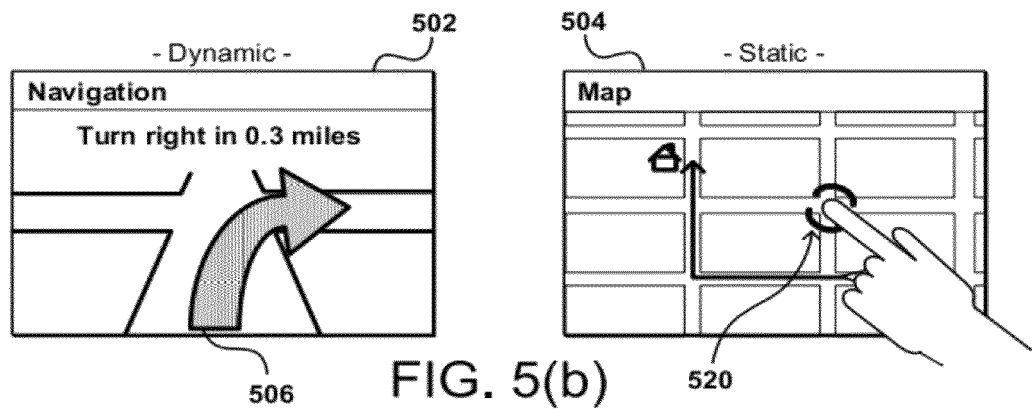
Figure 5C:
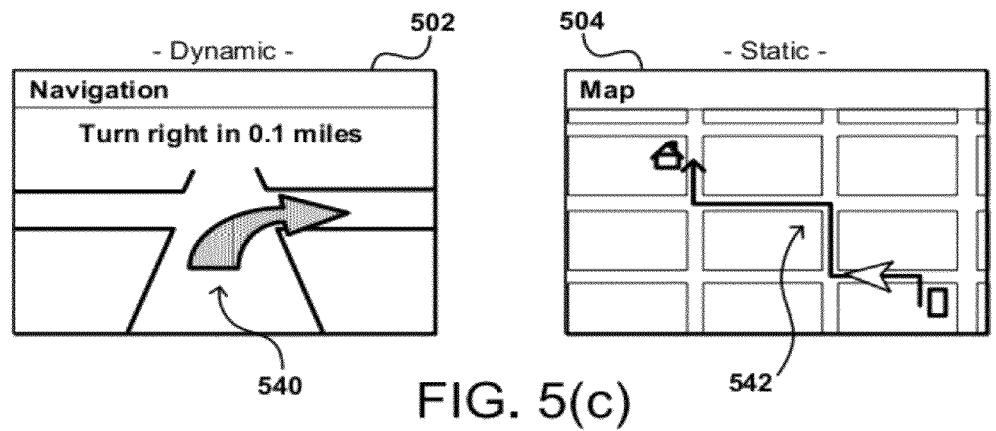

As mentioned above, the static display element can also be used to provide input to the device, such as may cause the information displayed on the dynamic screen to be updated. For example, FIGS. 5(a)-5(c) illustrate displays for a navigation application that can be used with a device with a static and a dynamic display screen as discussed herein. For example, in the situation 500 illustrated in FIG. 5(a), the user has selected a route between a start point 508 (e.g., work) and a destination 510 (e.g., home). The dynamic display 502 can update the navigation directions in real time as the user moves, providing instructions 506 and other relevant information. The static display 504 might instead display information that will not change as often, such as a map showing the route between the start point and destination. In some embodiments, the map displayed might not change during the trip, while in other embodiments a marker 512 indicating the user's current position might update periodically, as well as when the user deviates from the selected path or at other such points in time. Other variations are possible as well within the scope of the various embodiments.

At some point, a user might want to adjust the route to be taken, such as when the user wants to add a waypoint or wants to select a different route based on traffic, etc. As illustrated in FIG. 5(b), a user can touch or press a location 520 on the map illustrated on the static display element to alter some aspect of the navigation. In some embodiments, the user might pick a point along the route and drag that point to a new location, while in other embodiments the user might apply pressure to "push" the location to the other side, such that the navigation directions will take that point into consideration. As illustrated in FIG. 5(c), the dynamic display presents updated navigation instructions 540 based on the new point, and the static display 504 shows a new route 542 including that point. Various other approaches can be used as well within the scope of the various embodiments.

In another example of the user using the static display as the primary display, the user might view an e-book using the static display. The user can have the ability to push words or phrases through to the active display, which can cause information about those words or phrases to be displayed on the dynamic display. This information can include, for example, definitions or search results for words pushed through the device. In some embodiments, the pages of the book can include rich content, such that the user can have the ability to push an icon or symbol through the device, which can cause a video to be played or an image to be displayed on the dynamic display.

It should be understood, however, that other actions could be used to perform the same or similar tasks. For example, a user can select a word of interest by touching or otherwise interacting with that word, and then can change an orientation of the device such that a different display element is facing the user (as may be detected via image analysis, inertial sensors, or other such processes or components as discussed elsewhere herein). Such an action could produce a similar result to pushing one or more words through the device, as a definition or other content associated with the word(s) can be displayed on the other display element. In various embodiments, a device might not utilize any touch-sensitive material, but might instead enable interaction through buttons, motions, changes in orientation, or other such approaches discussed and suggested elsewhere herein.

In some embodiments, a device might instead (or additionally) provide for other types of pressure-sensitive input. For example, portions of an edge (or other) region of the device can enable a user to provide input to the device by "squeezing" at an appropriate location on the device. For example, a user might apply at least a minimum amount of pressure on opposing sides of the device in order to switch the display of content from one display element to another. In other embodiment, the user can squeeze at a location corresponding to specific content, such as at a location corresponding to a specific result in a list of search results, to open up that result on the other display element. Various other uses of such pressure-based input can be used as well in accordance with the various embodiments.

Figure 6:
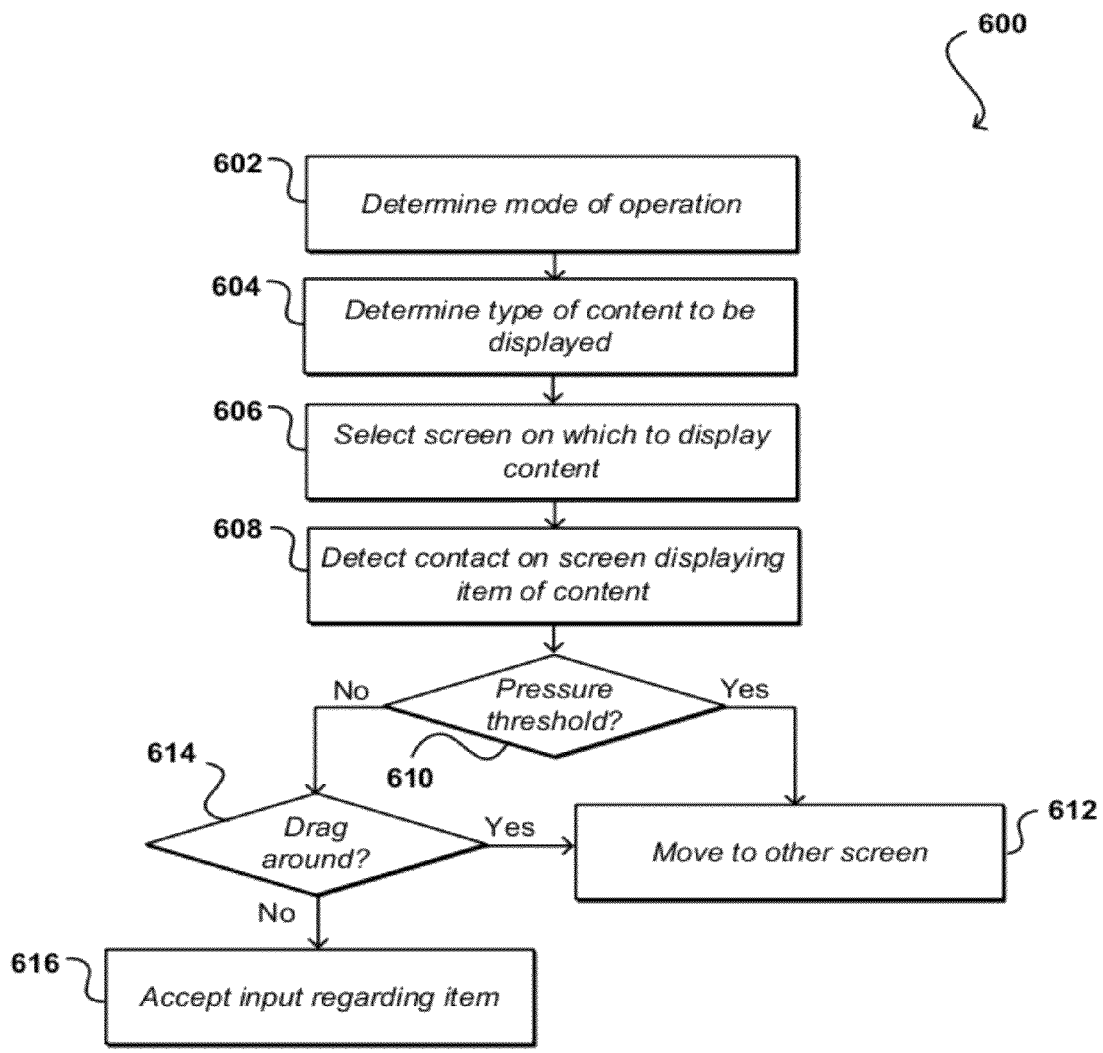
FIG. 6 illustrates an example process for placing and moving content between display elements of a device that can be used in accordance with various embodiments.

FIG. 6 illustrates an example process 600 for selecting and/or moving information from one display element to another that can be used in accordance with various embodiments. In this example, the device determines a mode of current operation 602. For example, the device might have one display facing up while the device is on a table or might have one display facing the user (as may be determined using at least one camera imaging the user), which can cause that display to be designated the active display. In other instances, the brightness might cause one display to be selected over the other, such as an e-ink display being selected as the active display when the device is out in the direct sunlight and the user would likely not be able to see information on an LCD or similar screen. In still other instances, the mode might be determined by an application that the user is running, such as a video mode (which might cause an LCD to be designated as the active display) or an e-book application (which might cause an e-ink display to be designated as the active display). The device can also determine the type of content to display 604, and can select whether to display that content on the active display or another display based on the current mode and/or type of content 606. In some embodiments, the content might be split between the two types of display as appropriate. For example, if the user is reading an e-book using the LCD display (due to low surrounding light, etc.) then the e-ink display on the back might display the cover of the book. If the user goes outside and flips the device over to read the book using the e-ink display, the LCD might not show the cover of the book due to the amount of power needed to continuously display the cover. In other embodiments, the LCD might only display the cover when the user is moving the device, another person is detected to be looking at the device, etc.

Subsequently, contact with an item displayed on one of the display screens can be detected 608. If the contact at least meets a minimum pressure threshold 610, the item can be "pushed through" the device and information for the item displayed on the screen on the other side of the device. If not, but the device detects the item being "dragged" around the edge of the device using touch-sensitive material 614, the item can still be moved to the screen on the other side. It should be understood that other approaches can be used as well within the scope of the various embodiments. For example, a camera might detect the user making a dragging motion around the edge of the device if the device does not have touch sensitive material on the edge, etc. In other embodiments, a user might flip or otherwise adjust an orientation of the device, issue an audio command, make a predetermined gesture, or perform some other action that can result in content passing from one display element to another. If the item is not to be passed to the other display, the device can treat the contact as an appropriate input or selection with respect to that item 616. For example, a user might want to select an element for a specific purpose without intending to push or drag that element to the other display.

As discussed, there can be many applications and uses that can take advantage of having at least two types of display on a device as discussed and suggested herein. For example, a device can offer a customizable skin or other decorative back or casing, which will not continually drain power from the device. Such an approach can be particularly interesting where the static display is a multi-color display and/or where the display wraps around at least some of the edges of the device. A user can select patterns that change or rotate over time, reflect the current location or time of day, etc. For example, a user might have one skin while at work or school, but another one when at home, which changes automatically based on detected location, time of day, etc.

Users can also take advantage of the fact that certain types of display are easier to read in certain lighting conditions. For example, an electronic paper display might be easy to read in direct sunlight, but difficult to read in low lighting or dark environments. Alternatively, displays such as LCD or OLED displays might be easy to read in dark environments, but difficult to read in direct sunlight due to glare, contrast, and other such issues. In at least some embodiments, a user can drag or push content through to the other screen in order to view content on a screen that is easiest to view under the current lighting conditions. In some embodiments, the device can automatically adjust the display when the user turns the device over, such that the other screen is facing the user, not face down, etc. Such an approach enables a user to flip the device and automatically have the information displayed on the other side of the device when the user goes outside, turns off a light, or performs another such action. The "flipping" of the device can be determined using any appropriate component(s) of the device. For example, a camera or other imaging element might attempt to locate the relative position of a current user of the device and adjust the display of content based on which side of the device is currently facing the user. In other embodiments, one or more elements such as accelerometers, electronic gyroscopes, and/or inertial sensors can be used to determine a current orientation and/or changes in orientation of the device. In some embodiments, relatively quick and/or large motions of the device can cause content to be moved from one screen to the other, as may be configurable by the user.

In some embodiments, a light sensor might be used to suggest (or select) a display element of a device on which to display content at a present time due to the amount of ambient surrounding light or other such factors. While such embodiments can be useful for applications such as e-books and Web browsing, they also can be useful for other applications, such as where a user receives a call outside and wants to be able to view who is calling. If a cell phone has an e-ink display on the back, the user can rotate the device as needed to view the information.

Further, a user can select to place a computing device on a surface such that a particular display is visible. If the user wants to have access to calendar or schedule information which changes relatively infrequently, for example, the user might place the device on a desk or other surface with the e-ink side up, such that the information can be displayed continually while consuming very little power. This could be a low power or "desk mode" setting. If the user needs to interact with the device or wants access to information that changes more frequently, the user can orient the device such that the dynamic display is facing up, facing the user, etc. In some embodiments, elements such as orientation determining elements and proximity sensors can be used to detect an orientation of the device, either generally or with respect to a user, for example, which can be used to select a mode of operation of the device, activate certain display modes, etc.

In at least some embodiments, a user can select where to place content pushed through the device to another display. As discussed above, the user can apply pressure to an item of content displayed on one screen, and cause that item to be displayed on a screen on the other side of the device. In some embodiments, a user can apply an input that acts as a "cut" or "copy" action, such as by applying pressure for a period of time sufficient to act as a cut or copy command, but not long enough to cause the content to be pushed through to the other side. In other embodiments, the user might apply less pressure to input a cut or copy command than a "push" command. The user then can have the ability to "point" to the location on the other display where the user wants to paste the item. In at least some embodiments a similar input (i.e., with similar pressure and/or duration) can be used to input a paste command.

A user can also select or configure information to be displayed on the e-ink screen such that the information is continually available while interacting primarily with the other display element (or other elements of the device). For example, if the user is doing chemistry homework then the user might cause the periodic table to be displayed on the e-ink screen, as the image will not change while the user is doing the homework and thus will not draw any additional power. In other cases, a user might configure a device to continually show that day's schedule on the e-ink screen, unless the user is utilizing that screen for another purpose. Thus, instead of an artistic skin, the user can effectively utilize the e-ink display to provide useful information at times when the user is not otherwise utilizing that display for other purposes. In some embodiments, the device can display information that is relevant to an activity or aspect of the user or device at the current time. For example, if the device is playing a song then the e-ink display might display album art corresponding to that song. If the user is reading an e-book, the device might display on the back of the device the "cover" of the e-book. If the user is playing a video game, the back of the device could display box art or other art or information relating to the game.

The user can also cause one or more display elements of the device to blink, flash, animate, or otherwise adjust to provide some type of notification or information to the user. For example, one or more display elements of the device can flash if there is an incoming call or new message. An advantage to having a display element along the outer edge of the device is that the edge can flash in a way that can be seen by the user regardless of the side that is facing down, away, etc. In some embodiments, the element that changes can be determined dynamically based upon the determined relative position of a user, as may be based upon image analysis or other detection algorithms. In at least some embodiments, at least one display element of a device can play an animation during such a notification, which can be accompanied by an audible notification or presented in place of an audible notification, as may be configured by the user or determined based upon information about the surroundings of the device. For example, if the device determines based upon calendar information that the user is likely in a meeting, the device might provide a visual notification without an audible notification.

Various other detection mechanisms can be used to adjust a mode of operation of a computing device. As discussed, a light sensor might cause an LCD display to power down and an e-ink display to be activated when the surrounding light exceeds a specified threshold. Alternatively, or in addition, a camera or infrared detector can image the user and attempt to determine whether the user is squinting. If so, the device can activate a mode to assist the user in viewing the information, whether adjusting a brightness or activating a different element. In some cases, the device might instead ask the user to turn the device around in order to improve viewing conditions, and might switch the display mode upon the user adjusting the orientation of the device.

The ability to display information or content that changes often on one display, while displaying information or content that does not often change, can also be advantageous in both single player or multi-player games. For example, a user playing a single player game might utilize the dynamic display as a primary viewing mechanism for playing a game, such as a first person shooter (FPS), and might utilize the static display for information such as a map or current inventory. In other embodiments, a first user can utilize the dynamic or static screen during a game while one or more other users utilize the other display. For example, two users can each use one screen to play a game such as battleship. In other cases, however, a device might utilize the static screen to display information to a group of players, such as the answer to a question the current user is trying to guess, and the user can utilize the primary screen to attempt to input the correct answer. Various other alternatives can be utilized as well, as should be apparent in light of the present disclosure.

In at least some embodiments, a device might retain information such as meta data, conversion information, or alternative versions of information or content moved between display elements. For example, a device might convert an image when moving that image from an LCD display to an e-ink display, in order to optimize the image for that display. In some embodiments the device might store (at least temporarily) a copy of the original image, while in other embodiments the device might store information enabling the device to quickly convert back to the original image without having to again execute a full conversion process on the image. In some embodiments, the device might maintain one or more mappings, such as for anti-aliasing of fonts, enabling the device to convert back and forth between the appropriate formats. In some image conversion there might be a loss of information and/or resolution, so it might be advantageous in some situations to retain a cached copy of the original image.

In some embodiments, a device can provide two different displays of similar content on different types of display element. For example, a user might browse a Web site using a device with an e-ink display and an LCD display. The device might display a text-only version of the page on the e-ink display, and a full version of the page on the LCD display. In this way, a user can quickly scan the text information using the e-ink display without having to wait for any images to load, having to navigate around advertisements or banners, etc. If the user is interested in seeing an image or other information for the page, the user can view the LCD display. In other embodiments, the ads can be displayed on the back of the device such that advertisers can still get the information out there, as may be viewed by other people in the room or nearby, and the user can receive fewer ads on the primary display. In some embodiments, a camera can determine whether any people nearby viewed the advertisement, and can update the ad and/or report information accordingly.

Figure 7:
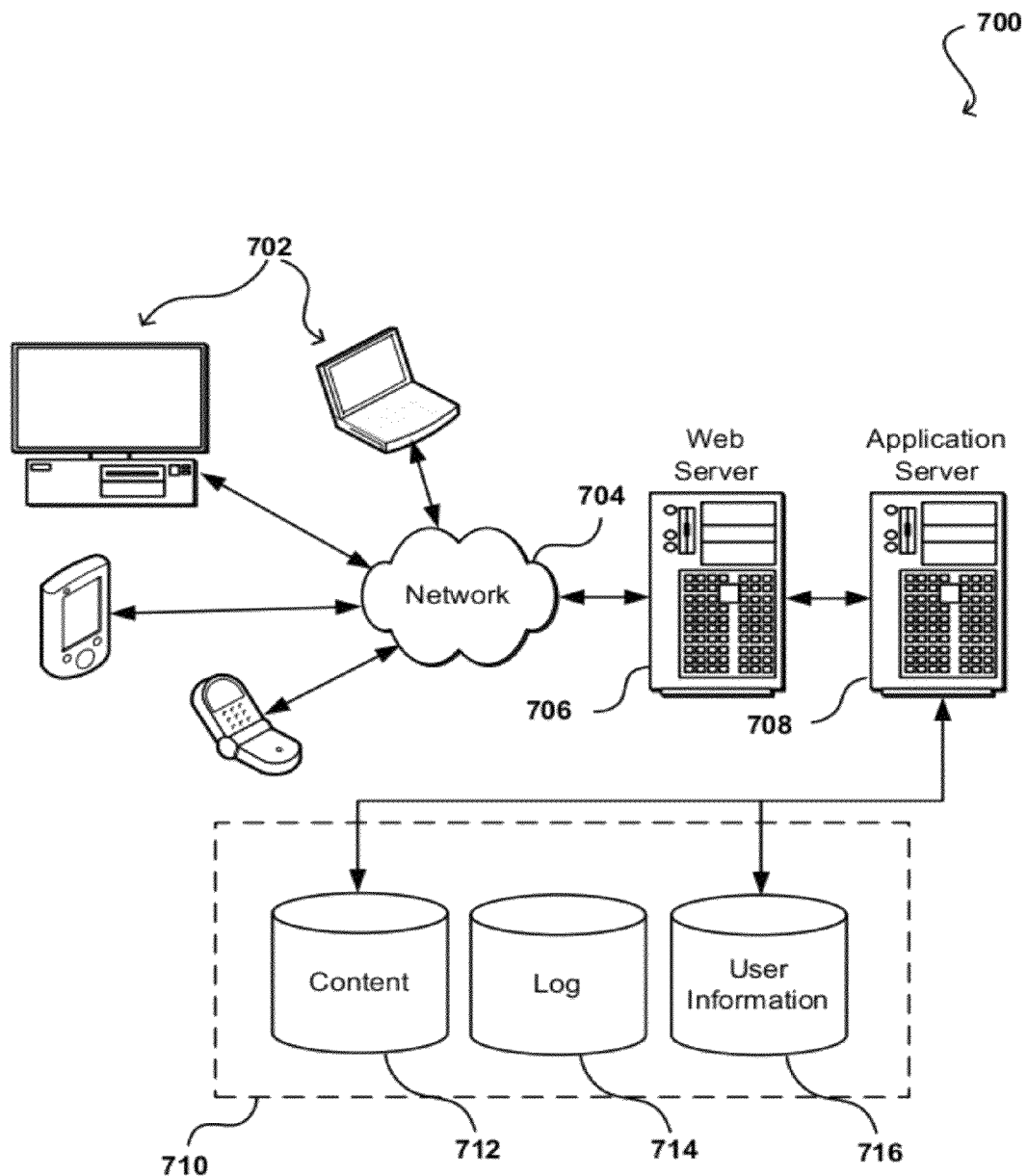
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network also can communicate with devices such as a charger (not shown), as discussed herein. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of displaying content on an electronic device, comprising:
    under control of one or more computing systems configured with executable instructions,
        determining a type of content to be displayed on the electronic device, the electronic device including first and second display elements on opposing sides of the electronic device, the first and second display elements each having at least one different display characteristic, wherein the first display element is configured to display, at least in part, substantially dynamic content and the second display element is configured to display, at least in part, substantially static content, and wherein each of the first and second display elements is at least partially touch sensitive;
        based at least in part upon the type of content and the at least one different display characteristic of each of the first and second display elements, causing at least a portion of the content to be displayed on a determined one of the first and second display elements; and
        in response to input from a user of the electronic device, causing at least the portion of the content to be displayed on the other of the first and second display elements, the electronic device including at least one touch sensitive element proximally located to a casing of the electronic device, the input including a touch gesture detected on the casing to drag the at least the portion of the content from the first display element to the second display element via the casing.

2. The computer-implemented method of claim 1, wherein the electronic device is one of a tablet computer, a smart phone, a personal computer, a personal data assistant, and a portable gaming device.

3. The computer-implemented method of claim 1, wherein the input from the user corresponds to contact from the user with one of the first and second display elements for at least one of a minimum duration or with at least a minimum amount of pressure.

4. The computer-implemented method of claim 1, wherein at least a portion of the electronic device other than the first and second display elements provides for at least one of contact-based input, pressure-based input, motion-based input, or squeeze-based input.

5. The computer-implemented method of claim 4, wherein the input from the user corresponds to a user dragging at least the portion of content from one of the first and second display elements to the other of the first and second display elements across the portion of the electronic device that provides for contact-based input.

6. The computer-implemented method of claim 1, wherein each of the first and second display elements provides for contact-based input, and wherein the contact-based input is provided using an interpolating force-sensitive resistance material.

7. The computer-implemented method of claim 1, the first display element has a faster refresh rate than the second display element.

8. The computer-implemented method of claim 1, wherein the second display element is an electronic ink or electronic paper display element.

9. The computer-implemented method of claim 1, wherein the first display element is a liquid crystal or organic light emitting diode display element.

10. The computer-implemented method of claim 1, wherein the input from the user corresponds to the user changing an orientation of the electronic device.

11. The computer-implemented method of claim 1, wherein causing at least a portion of the content to be displayed on a determined one of the first and second display elements is further based on an amount of ambient light around the electronic device as detected by at least one light sensor of the electronic device.

12. The computer-implemented method of claim 1, wherein the content is capable of being displayed on the second display element even when the electronic device is not in use, the content serving as artwork for at least a portion of the exterior of the electronic device.

13. An electronic device, comprising:
    a processor;
    memory including instructions that, when executed by the processor, cause the electronic device to:
        determine a type of content to be displayed on the electronic device, the electronic device including first and second display elements on opposing sides of the electronic device, the first and second display elements each having at least one different display characteristic, wherein the first display element is configured to display, at least in part, substantially dynamic content and the second display element is configured to display, at least in part, substantially static content, and wherein each of the first and second display elements is at least partially touch sensitive;
        based at least in part upon the type of content and the at least one different display characteristic of each of the first and second display elements, cause at least a portion of the content to be displayed on a determined one of the first and second display elements; and
        in response to input from a user of the electronic device, cause at least the portion of the content to be displayed on the other of the first and second display elements, the electronic device including at least one touch sensitive element proximally located to a casing of the electronic device, the input including a touch gesture detected on the casing to drag the at least the portion of the content from the first display element to the second display element via the casing.

14. The electronic device of claim 13, wherein each of the first and second display elements provides for contact-based input, and wherein the input from the user corresponds to contact from the user with one of the first and second display elements for at least one of a minimum duration or with at least a minimum amount of pressure.

15. The electronic device of claim 13, wherein at least a portion of the electronic device other than the first and second display elements provides for contact-based input, and
wherein the input from the user corresponds to a user dragging at least the portion of content from one of the first and second display elements to the other of the first and second display elements across the portion of the electronic device that provides for contact-based input.

16. A non-transitory computer-readable storage medium including instructions that, when executed by a processor, cause the processor to:
determine a type of content to be displayed on an electronic device, the electronic device including first and second display elements on opposing sides of the electronic device, the first and second display elements each having at least one different display characteristic, wherein the first display element is configured to display, at least in part, substantially dynamic content and the second display element is configured to display, at least in part, substantially static content, and wherein each of the first and second display elements is at least partially touch sensitive;
based at least in part upon the type of content and the at least one different display characteristic of each of the first and second display elements, cause at least a portion of the content to be displayed on a determined one of the first and second display elements; and
in response to input from a user of the electronic device, cause at least the portion of the content to be displayed on the other of the first and second display elements, the electronic device including at least one touch sensitive element proximally located to a casing of the electronic device, the input including a touch gesture detected on the casing to drag the at least the portion of the content from the first display element to the second display element via the casing.

17. The non-transitory computer-readable storage medium of claim 16, wherein each of the first and second display elements provides for contact-based input, and
wherein the input from the user corresponds to contact from the user with one of the first and second display elements for at least one of a minimum duration or with at least a minimum amount of pressure.

18. The non-transitory computer-readable storage medium of claim 16 wherein at least a portion of the electronic device other than the first and second display elements provides for contact-based input, and
wherein the input from the user corresponds to a user dragging at least the portion of content from one of the first and second display elements to the other of the first and second display elements across the portion of the electronic device that provides for contact-based input.

19. A system, comprising:
at least one processor;
memory including instructions that, when executed by the processor, cause the system to:
determine a type of content to be displayed on the system, the system including first and second display elements on differing sides of the system, the first and second display elements each having at least one different display characteristic;
based at least in part upon the type of content and the at least one different display characteristic of each of the first and second display elements, cause at least a portion of the content to be displayed on a determined one of the first and second display elements; and
in response to input from a user of the system, cause at least the portion of the content to be displayed on the other of the first and second display elements, the system including at least one touch sensitive element proximally located to a casing of the system, the input including a touch gesture detected on the casing to drag the at least the portion of the content from the first display element to the second display element via the casing.

20. The system of claim 19, wherein each of the first and second display elements provides for contact-based input, and
wherein the input from the user corresponds to contact from the user with one of the first and second display elements for at least one of a minimum duration or with at least a minimum amount of pressure.

21. The system of claim 19, wherein at least a portion of the system other than the first and second display elements provides for contact-based input, and
wherein the input from the user corresponds to a user dragging at least the portion of content from one of the first and second display elements to the other of the first and second display elements across the portion of the system that provides for contact-based input.

22. The system of claim 19, wherein the second display element is at least one of an electronic ink or electronic paper display element, and wherein the first display element is at least one of a liquid crystal or organic light emitting diode display element.

23. The system of claim 19, wherein causing the at least the portion of the content to be displayed on the determined one of the first and second display elements is further based on an amount of ambient light around the system as detected by at least one light sensor of the system.

24. The system of claim 19, wherein the content is capable of being displayed on the second display element even when the system is not in use, the content serving as artwork for at least a portion of the exterior of the system.

* * * * *